United States Patent [19]

Mickelson

[11] 3,755,148

[45] Aug. 28, 1973

[54] HYDROCARBON HYDROGENATION

[75] Inventor: Grant A. Mickelson, Yorba Linda, Calif.

[73] Assignee: Union Oil Company of California, Los Angeles, Calif.

[22] Filed: Apr. 1, 1971

[21] Appl. No.: 130,493

Related U.S. Application Data

[63] Continuation-in-part of Ser. No. 837,340, June 27, 1969, abandoned, which is a continuation-in-part of Ser. No. 761,322, Sept. 20, 1968, abandoned.

[52] U.S. Cl............... 208/143, 260/667, 260/683.9, 252/437, 252/470
[51] Int. Cl............................................. C10g 23/02
[58] Field of Search.................... 252/435, 455, 458, 252/437, 470; 208/114, 143; 260/683.9, 667

[56] References Cited
UNITED STATES PATENTS

| | | | |
|---|---|---|---|
| 2,547,380 | 4/1951 | Fleck | 208/243 |
| 2,608,534 | 8/1952 | Fleck | 252/435 |
| 3,232,887 | 2/1966 | Pessimisis | 252/435 |
| 3,287,280 | 11/1966 | Colgan et al | 252/435 |

*Primary Examiner*—Herbert Levine
*Attorney*—Milton W. Lee, Richard C. Hartman, Lannas S. Henderson and Michael H. Laird

[57] ABSTRACT

Hydrocarbons having at least one point of carbon-to-carbon unsaturation are reacted with hydrogen under hydrogenation conditions including a catalytic combination of at least one molybdenum compound and at least one Group VIII metal or metal compound prepared by impregnating a foraminous refractory oxide support with a highly stable solution of the metal compounds and an acid of phosphorus wherein the impregnating solution has a $P/MoO_3$ weight ratio of about 0.1 to about 0.25 and an initial pH of about 1 to about 2. Even greater advantage relative to previously available hydrogenation systems is realized when operating on feedstocks containing substantial amounts of organo-nitrogen compounds.

11 Claims, No Drawings

HYDROCARBON HYDROGENATION

This application is a continuation-in-part of my co-pending application Ser. No. 837,340, filed June 27, 1969 now abandoned, itself a continuation-in-part of my application Ser. No. 761,322, filed Sept. 20, 1968, now abandoned.

BACKGROUND

The considerable volume of literature published in the area of hydrogenative hydrocarbon conversion over the past several years makes it readily apparent, even upon only cursory investigation, that considerable effort has been devoted to understanding, defining and improving the numerous aspects and characteristics involved in the variety of processes and reaction mechanisms observed in the catalytically promoted reaction of hydrogen with hydrocarbons. Obviously the investigation of catalyst characteristics such as physical and compositional properties have significance in a commercial context or in most technological contexts with relation to the response that the catalyst exhibits in a given process environment. A brief investigation of the literature thus far published on this subject illustrates that the number of process perameters, which should realistically include catalyst's compositional and physical characteristics, is almost endless. In addition, the significance of some of these perameters changes in response to changes in other variables. For example, the most highly active gasoline hydrocracking catalysts are not the most highly active midbarrel hydrocracking catalysts. Conversely catalysts which exhibit excellent activity in the absence of nitrogen, sulfur, and/or aromatic compounds often exhibit markedly inferior activity, as compared to other compositions, for hydrocracking feedstocks containing substantial amounts of these deleterious materials. In otherwords, the activity and selectivity of a given catalyst must be determined not only in relation to the particular conversions desired, i.e., gasoline hydrocracking, midbarrel hydrocracking, denitrogenation, desulfurization, olefin hydrogenation, aromatics hydrogenation and the like, but must also be evaluated in view of the system in which the catalyst is expected to perform these objectives.

Obiously all of the problems involved in this area of technology have not yet been solved nor are the several process perameters which compliment or mitigate against the desired objectives completely understood. Consequently, the continuing development of hydrocarbon hydrogenation systems is largely a matter of educated guess, empirical evaluation, and a comprehensive understanding of empirical results. The necessity for this approach to the solution of problems such as improving the activity of a given hydrocarbon conversion system, the selectivity of such systems or their tolerance to what might otherwise be process impurities, derives from the lack of an exact understanding of the nature of those factors which limit activity, selectivity and the like, or procedures and compositions which can be employed to correct those problems once identified without detracting from other desired qualities of the original system.

One area of development in which the aforegoing observations are particularly pertinent is that of the present invention. These systems involve hydrocarbon hydrogenation, i.e., the reaction of unsaturated hydrocarbons with either elemental hydrogen or hydrogen supplied by a hydrogen donor, in the presence of a catalyst comprising molybdenum, at least one Group VIII metal compound and phosphorus supported on a refractory inorganic oxide. Compositions containing these and other elements have been the subject of previous investigation. For example, hydrotreating catalysts comprising a Group VIII metal, particularly cobalt, or nickel, a Group VI metal, particularly molybdenum or tungsten, or their oxides or sulfides, and phosphorus on an alumina or silica-stabilized alumina base have been disclosed in U.S. Pat. Nos. 3,232,887 and 3,287,280. Those catalysts are discussed as being suitable for denitrogenation or desulfurization of petroleum feedstocks as well as for other hydrogenation reactions. U.S. Pat. No. 3,287,280, in particular, describes methods and impregnating solutions for preparing such catalysts consisting of molybdenum and nickel salts stabilized with phosphoric acid in an aqueous medium. The author discloses the desirability of maintaining the amount and ratio of the constituents of the impregnating solution within relatively narrow ranges. It is this latter observation that is of particular interest in view of the discoveries I have made in an effort to further understand the functions played by each element of these compositions, the interaction of those functions and the manner in which those functions and interactions are dependent upon the characteristics of a given hydrogenation system. Although the results of these investigations, discussed in detail hereinafter, provide some insight into several aspects of the performance of certain catalyst compositions in hydrogenative conversion systems, they are unfortunately not sufficiently comprehensive to afford a general understanding of a significant number of influencing factors.

Nevertheless, on the basis of these observations I have been able to establish that the ratio of phosphorus-to-Group VI metal, particularly molybdenum, employed in such solutions is critical, and that the response of the resulting catalysts in hydrogenative conversion systems is substantially enhanced by the use of higher phosphorus-to-molybdenum metal ratios than are employed in the conventional catalyst preparations. In addition, it has been found that proper regulation of the pH of the solution is essential in order to obtain maximum catalytic activity in these systems.

For the catalysis of hydrogenative hydrocarbon conversions such as denitrogenation or desulfurization, the catalytic metals are generally employed in the form of oxides in association with a carrier material. Conventionally, the catalytic metals are applied to the carrier by impregnation with a solution of a compound of the metal, followed by calcination to convert the catalytic metal compounds to oxides. The use of an acid, such as phosphoric acid, as a component of the impregnation solution is disclosed in the above-mentioned U. S. patents. The disclosed function of the acid is the stabilization of the impregnating solution containing both the Group VI and the Group VIII metal compound.

However, I have found that stabilization of the impregnating solution per se affords a solution for only one of the major problems associated with the impregnation of catalysts with Group VIII and Group VI metal components. It is generally recognized that the formation of an evenly distributed layer of the active components such as the metals, oxides, or sulfides throughout the entire surface area of the catalyst support enables the most efficient utilization of the entire catalyst surface area, and thereby provides the most active catalyst in most applications. The impregnation of such catalysts supports with the active components herein discussed by the use of "unstabilized" solutions is subject to several distinct disadvantages. For example, precipitation of the active components from solution even prior to contact with the catalyst support occurs to such a significant extent that a considerable amount of the active components are lost as waste material. The catalysts thus formed do not comprise an evenly distributed active component layer. In addition, the active components are deposited on the support surface in the form of crystalline aggregates forming a heterogeneous non-uniform catalytic surface of inferior activity. This problem, becomes particularly acute at higher concentrations. For this and other reasons hereinafter discussed, it has previously been necessary to employ impregnating solutions of such reduced concentrations that multiple impregnations were necessary to effect the deposition of the desired amount of active material on the support surface. The multi-step impregnation procedure necessitated by solution instability generally involves the repeated cyclic contact of a support such as silica or alumina with an impregnating solution of relatively low concentration. Intermittent partial drying between impregnation cycles is often necessary to render the deposited materials in the form less susceptible to extraction on subsequent contact with additional impregnating medium. In that this procedure obviously necessitates a rather involved cyclic batch operation it is much less attractive than a simpler single step or continuous impregnation-calcination procedure. However, the use of that simplified procedure is not advisable due to the instability of the impregnating solutions. The catalysts thus produced are of inferior activity. This result is believed to be attributable to the distribution of active components on the surface of the support medium in a non-uniform manner as relatively large crystalline aggregates.

The same disadvantages are associated with the use of the so called "stabilized" impregnating solutions heretofore employed. The stability of those solutions is not sufficient to enable the use of impregnation media of sufficient concentration to deposit the desired amount of active components on a catalyst support in a single impregnation step. An even distribution of the desired component concentration cannot be achieved in a single step, e.g., single dip or spray procedure, due to the fact that impregnating solutions of sufficiently high concentration cannot be maintained in a stable form.

I have also observed that even the catalysts produced by multi-step impregnation with the dilute "stabilized" solutions of the prior art are markedly inferior to those obtainable by the procedures herein described. The "stabilized" solutions of the prior art, such as those discussed in U. S. Pat. Nos. 3,232,887 and 3,287,280 are more stable in the classical sense than are solutions containing no stabilizing component. Precipitation from these "stabilized" solutions is less likely in the absence of a support surface, provided the concentration of active components in the impregnating solution is relatively low. However, the active components deposit from these solutions on the support surface as crystallites. This form of deposition is apparently due to the promotion of crystallization of the active components by the support surface. Whatever the cause of crystallite formation, it is understandable that once crystallites form they tend to promote continued crystallization. The result is isolated crystal growth and crystalline aggregate formation in the pores and on the surface. The obvious consequence of this sequence of events if the formation of an unevenly distributed layer of active components on the surface of the support matrix. Such heterogeneity of the catalyst surface is accountable for the lower activity observed.

In addition to these considerations I have found that the anomalies observed in the impregnation step are not the only enigmas involved in the formulation of a highly active catalyst having the most desirable tolerance to process and regeneration conditions. The formation of a homogeneous catalyst surface alone does not solve all the problems involved in the preparation of these catalysts. On the contrary, I have observed that the manner in which the catalyst is treated subsequent to impregnation has a dramatic influence on the activity of the finished product. It has previously been considered most expeditious to expose the impregnated support to a preheated furnace in which volatile materials, e.g., water, are rapidly expelled. However, I have discovered that drying of the impregnated support should be conducted at a rate much less than the maximum in order to obtain the most active product. Although the reasons for this result are not known with certainty, it is presumed that either rapid crystallization or steaming of that catalyst are at least partially accountable. It may be that accelerated drying and the corresponding rapid increase in the solution concentration on the surface promote the formation of crystallites and crystalline aggregates.

It is therefore one object of this invention to provide a catalyst and hydrogenation system of increased activity. It is another object of this invention to provide an improved method for hydrogenating hydrocarbons. Yet another object of this invention is the provision of an improved system for hydrogenating hydrocarbons in the presence of organonitrogen compounds. It is another object of this invention to provide an improved aromatics hydrogenation process. Yet another object of this invention is the provision of an improved process for hydrogenating aromatic hydrocarbons in the presence of organo-nitrogen compounds. Another object of this invention is the hydrogenation of aromatic and olefinic hydrocarbons in organo-nitrogen containing feeds.

DETAILED DESCRIPTION

According to the present invention, it has been found that the use of amounts of phosphoric acid, particularly relative to that of Group VI metal, greater than those taught by the prior art is not only effective in stabilizing the impregnating solution but also substantially enhances the catalytic activity of the finished catalyst. The reason for the enhanced activity of the catalysts of the invention is not known with certainty but is believed to relate to the fact that during the preparation of the catalysts of the invention an amorphous colloidal film of the impregnating materials is deposited on the surface of the support, whereas, in the prior art methods the impregnating materials are deposited in crystalline form. This is believed to result in more uniform distribution of the molybdenum and nickel ions on the surface of the carrier throughout its pore stucture when the process of the invention is employed. It can, in fact, be shown that impregnation solutions prepared according to the process of the invention do not crystallize or precipitate upon standing for months at room temperature. Moreover, no crystallized or precipitated material is formed upon drying the solutions in an evaporating dish or in a thin film on glass, metal or ceramic surfaces; instead, a transparent colloidal film is formed. Solutions outside the limits of concentration and pH of the invention crystallize or precipitate before or during drying and yield opaque films on surfaces. The effectiveness of the impregnation procedures herein described in enabling the formation of amorphous, as opposed to crystalline, deposits is demonstrated by the hereinafter discussed illustrative examples.

As previously mentioned, the conditions necessary to achieve this result at the relatively high concentrations necessary to produce a catalyst of the desired composition by a single step impregnation procedure, are quite critical. It is presently felt that the most critical of these process conditions are the pH of the impregnation solution that exists in contact with the catalyst support and the P/MoO$_3$ weight ratio in both the solutions and the final products. The pH necessary to achieve this result in these systems when the MoO$_3$ level exceeds about 10 weight-percent, especially at levels above about 17 percent, must be within the range of 1 to about 2 for the solution initially contacted with the substrate. I have observed that some increase in pH values slightly above 2, i.e., up to about 2.5, can be employed without intolerable activity loss at somewhat lower concentrations, such as exist during the latter stages of impregnation when the concentration of active components in the impregnating solution are substantially diminished due to the deposition of those components on the catalyst support. However, the pH should be maintained as close as possible to about 1.5, i.e., from about 1.2 to about 1.8, during the course of the impregnation. Deviations from that midpoint in either direction render the impregnating solution less stable particularly at MoO$_3$ levels above 17 weight-percent. The greater the deviation, the greater the prospect of crystalline deposit formation and crystallite aggregation on the support surface.

In accordance with another embodiment of this invention a catalyst comprising a composite of a Group VIII and Group VI metal on a refractory oxide support of increased activity is prepared by drying an impregnated support under relatively mild conditions prior to calcination. It is presently preferred that the impregnated catalyst be heated gradually to a temperature only slightly in excess of the temperature necessary to expel the impregnating solution solvent retained on the catalyst. As this solvent is generally water, it is presently preferred that the drying temperature be allowed to gradually approach a temperature of at least about 220°F., preferably from 220° to about 250°F. It is presently preferred that the heat up rate not exceed about 20 °F/minute. This temperature is then maintained for a period sufficient to expel substantially all of the solvent, i.e., water from the substrate. It is generally desirable to reduce the physisorbed water content by this procedure to less than about 4 weight-percent and preferably less than about 2 weight-percent based on total catalyst weight. The accomplishment of that objective generally necessitates drying periods of from about 10 minutes to about 10 hours, depending on the temperature employed, the rate at which air is passed over the composite, the depth of the composite layer and the particle size. Shorter drying periods can, of course, be tolerated at the higher temperatures. A corollary advantage, in addition to the prevention of crystallite formation, is accomplished by this procedure in that steaming and consequent decrepitation of the catalyst particles is avoided. These deleterious effects appear to be a consequence of rapid heating to a point substantially above the boiling point of the volatile solvent, i.e., water, which results in the formation of substantial amounts of steam within the interior pore volume of the catalyst support. Although the prevention of this latter effect is believed to be less critical than the prevention of crystallite aggregate formation, it is desirable and is a corollary benefit of the preferred drying procedure.

It should be observed that the drying procedure referred to is not a necessary antecedent of the described impregnation procedure. Although rapid drying is believed to favor the formation of crystallite aggregates, the extent of aggregate formation on drying is not nearly so great as to completely dissipate the advantage of the homogeneous active component dispersion accomplished during the described impregnation procedure. Similarly the beneficial results ascribed to the preferred drying procedure are not limited to supports prepared by the impregnation procedure detailed herein. However, the advantage of this approach is more apparent when the impregnated support is relatively free of crystalline deposits prior to drying. The observance of rigid controls during the drying step would obviously be of little benefit with regard to crystallite formation in systems wherein a substantial proportion of the active components are already present in the form of crystalline aggregates due to the manner of impregnation. However, several corollary benefits, e.g., the prevention of particle decrepitation, are realized regardless of the physical form of the active metal deposit.

In accordance with yet another embodiment of this invention I have discovered a superior hydrogenation process in which unsaturated hydrocarbons are contacted with the described catalyst under a superatmospheric hydrogen partial pressure at conditions sufficient to promote at least the partial reaction of hydrogen with the unsaturated hydrocarbons.

Another embodiment of this invention involves a method which comprises contacting a hydrocarbon feed containing a substantial amount of aromatic hydrocarbons with the described catalysts under a superatmospheric hydrogen partial pressure and conditions of temperature, pressure and contact time sufficient to at least partially hydrogenate at least a substantial proportion of said aromatic hydrocarbons. In another embodiment of aromatic hydrocarbon feed contains a substantial amount of organonitrogen compounds.

Since the composition of the finished catalyst is conveniently expressed in terms of the amounts, i.e., weight percents, of the metal oxides and elemental phosphorus, the required amount of phosphorus for purposes of the present invention is most conveniently expressed as the ratio of the weight percent of elemental phosphorus in the finished catalyst to that of the weight percent of the Group VI metal oxide in the finished catalyst. For example, in the specific examples below, the amount of phosphorus is expressed in terms of the phosphorus-to-molybdenum oxide weight ratio, i.e., P/MoO$_3$. It has now been found that this ratio should be at least about 0.1 in order to achieve the desired improvement in the catalytic activity. On the other hand, the use of too high a concentration of phosphorus generally results in diminished catalytic activity. Consequently, the P/MoO₃ ratio in the product should be within the range of 0.1 to about 0.25, preferably from 0.12 to about 0.23.

Catalysts having these compositions are conveniently prepared by multi-step impregnation techniques, e.g., circulation dip, with solutions having P/MoO₃ ratios corresponding to those desired in the calcined product. The solutions generally contain from 10 to 30, preferably about 17 to 30 weight-percent MoO₃, 1 to about 10, preferably 1 to about 8 weight-percent of the selected Group VIII metal oxide and 2 to about 6 weight-percent phosphorus. However, when the simpler, more efficient single step pore saturation method is employed the solutions should contain the equivalent of about 17 to about 30, preferably 17 to about 24 weight-percent MoO₃, 1 to about 8, usually 1 to 5 weight-percent of the selected Group VIII metal oxide and 2 to about 6 weight-percent phosphorus.

When impregnation is accomplished by prolonged immersion of the foraminous base with excess solution, somewhat lower molybdenum concentrations can be employed. For example, the equivalent oxide mole ratios can be within the range of 10 to 17 weight-percent MoO₃, 2 to 10 weight-percent of the Group VIII metal oxide and 1 to 4 weight-percent equivalent elemental phosphorus.

In these systems the P/MoO₃ ratio is preferably somewhat lower than in the pore saturation techniques since phosphorus is deposited at a faster rate than is the molybdenum or Group VIII component. Higher pH, e.g., up to about 2.5 can also be tolerated in the more dilute solutions. However it is still preferable to assure that the initial pH of even these dilute solutions be within the range of 1 to about 2.

Group VIII metals, suitable for use in the invention are iron, cobalt and nickel, ruthenium, rhodium, palladium, osmium, iridium and platinum. The most attractive Group VIII and Group VI metals in these systems are cobalt, nickel, molybdenum and tungsten. However these systems exhibit the most significant superiority, in all respects, in the production of catalysts of molybdenum and a Group VIII metal, particularly nickel or cobalt, due to the relative instability of molybdenum containing solutions.

Optimum proportions of the molybdenum and the Group VIII metals in the finished catalyst will vary over a considerable range, again depending on the particular metals, the reaction in which the catalyst is employed, the carrier, etc. Optimum proportions are best determined experimentally and can readily be ascertained by one of ordinary skill in the art. Generally the Group VIII metal, based on the oxide, will comprise about 1 to 10, preferably 1 to 6 weight-percent of the catalyst, with the MoO₃ comprising about 5 to 40, preferably 10 to 20 weight-percent of the catalyst.

The required phosporus-to-Group VI metal oxide in the finished catalyst is obtained by employing suitable concentrations of the phosporus acid and the Group VI metal compound in the impregnating solution. Suitable concentrations will, of course, vary considerably with the particular Group VI and Group VIII metal compounds, the phosporus acid, the carrier, the pH and temperature of the impregnating solution, method of effecting the impregnation, etc., and are best determined empirically. For example, the most preferred acid of phosporus concentration will not generally be exactly the same in systems employing different forms of mulybdenum, e.g., ammonium molybdate, molybdic acid, molybdenum trioxide, molybdenum blue, e.g., nickel nitrate, cobalt sulfate, etc.

Orthophosphoric acid is the preferred source of the phosporus component of the catalyst of the invention. However, other phosphorus acids such as metaphosphoric acid, pyrophosphoric acid, phosphorous acid, etc., may be used. The compound of the Group VI metal, preferably molybdenum, can be any one or a combination of a variety of substances which have sufficient solubility in the impregnation solution to enable the deposition of the desired amount of metal. Illustrative compounds are the acids, oxides, and the simple and complex salts such as molybdenum trioxide, molybdenum blue, molybdic acid, ammonium dimolybdate, ammonium phosphomolybdate, ammonium heptamolybdate, nickel and cobalt containing molybdates and phosphomolybdates and the like. Molybdenum is presently preferred since the resultant components are the more active conventional components. Molybdenum containing impregnation solutions are also the most unstable and reflect the greatest improvement when treated in accordance with this invention. The presently preferred sources of molybdenum are molybdic acid, ammonium molybdate, molybdenum trioxide and ammonium heptamolybdate.

The presently preferred Group VIII metal sources are the salts of the desired Group VIII metal with the anions of strong acids. Exemplary of such anions are nitrate, sulfate, and the halides, particularly bromide, chloride and fluoride anions. This preference is due primarily to the fact that strong acid anions dissociate on admixture with the impregnation solution containing the acid of phosporus and the molybdenum source to form the corresponding acid. The strong acids are necessary to reduce the pH to a point within the essential range, i.e., 1 to about 2, at the preferred concentration levels of the respective metal sources. The nitrates are presently the preferred source of the Group VIII metal, nickel nitrate being particularly preferred due to the high activity of the resultant catalyst. Ammonium heptamolybdate is the presently preferred molybdenum source due to its high solubility. The anions other than nitrates are generally less preferred due to significant difficulties associated with their use. For example, the halides, derived from the Group VIII metal halide source, are useful in preparing these compositions but result in the evolution of the acidic halide or hydrogen halide gas upon drying and/or calcination. These materials are highly corrosive and are preferably avoided. The sulfate, on the other hand, is somewhat more difficult to keep in the original impregnation solution, making it advisable to employ slightly elevated temperature, i.e., from 100° to about 150°F., depending on the concentrations of the Group VIII metal sulfate. However, the use of the sulfate salt does have a distinct advantage. In the preparation of sulfided catalyst the conditions of calcination can be controlled so that the sulfate is not completely driven off and can be chemically reduced to produce a sulfided composite having a much more homogeneous distribution of sulfur than could otherwise be achieved. For example, the sulfate reduction can be conveniently carried out by exposing the calcined catalyst to a reducing atmosphere of hydrogen, carbon monoxide, etc.

A portion of the Group VIII metals can also be added in the form of salts of weak acids or as the hydroxides when it is desirable to raise the pH of the impregnation solution by this procedure. For example, if the admixture of the desired amounts of the active metal salts and acid of phosphorus results in a formation of a solution having a pH somewhat lower than desired in a particular application, the pH can be raised by the addition of a Group VIII metal base such as nickel or cobalt hydroxides and carbonates. However, this procedure is not presently preferred in that it requires the commensurate correlation of pH and active metal concentrations in the impregnation solution. As a result it is presently more preferred to raise the pH when it is initially lower than desired by the addition of a base not having a metal cation, such as ammonia. In any event, where base addition is employed to modify the initial pH, the amount of added base should not be so great as to increase the pH to a value outside the prescribed range.

Several procedural steps can be employed in the impregnation of the catalyst substrate with the compositions referred to. One such method, entitled the spray technique, involves spraying the support with a solution of the desired composition. The single-dip or pore volume method involves contacting the catalyst support with the impregnating solution generally by dipping for a period sufficient to fill the pores with impregnating medium. The appliation of vacuum is generally preferred in the latter approach. The impregnating solution can more readily displace air trapped in the interior pore volume of the catalyst support at reduced pressures.

The amount of solution and subsequently the amount of active components retained on the support will depend largely on the pore volume and adsorption capability of the support. Consequently, the characteristics of the support must be taken into account in determining the conditions necessary to obtain a composite of predetermined composition. In general, the preferred supports, e.g., alumina and silica-stabilized alumina containing less than about 30 weight-percent silica will have pore volumes of 0.6 to about 1.4 cc/gram and adsorption capacity sufficient to retain the desired amount of solution in a single step. Some variation in pore size outside this range will be encountered with other supports within the general class of inorganic refractory oxides, e.g., combinations of silica and alumina such as natural and synthetic crystalline and amorphous aluminosilicates and gels such as silica-alumina and silica-magnesia, to which this invention is applicable. Pore size should also be taken into account in designing the most appropriate systems for the impregnation of a given support. As a general rule more care should be taken in the preparation of relatively large pore size catalysts. Better results, i.e., deposit homogeneity and higher activity are more assured by observing the longer aging times prior to drying and following the more gradual drying procedures. These observations are particularly applicable to the impregnation of acid leached supports in which a portion of the pores are usually fairly large.

Following either of these procedures the impregnated support can be dried and calcined to produce a catalyst having the desired active metal concentrations, provided the concentration of the active metals in the impregnation solution is sufficient to deposit the desired amount of active metal compound on the support in a single step. This is one significant advantage of these novel impregnating solutions. The stability of solutions of much higher active component concentration can be maintained for considerable periods even in the presence of inorganic supports. When a single step approach is employed it is, of course, necessary to incorporate a definite amount of each active constituent into the impregnation medium and maintain the proper ratios between the several constituents per unit volume of solution in order to obtain a finished catalyst of the desired composition. It is also preferable to age the thus impregnated particles for at least about 30 minutes and preferably up to about 8 hours before drying and calcining. Aging after pore saturation in the absence of excess solution and under mild conditions, i.e., 70°F. to about 150°F., results in more even distribution of active components and improved activity.

The single-dip technique involves immersion of the particles in the impregnating solution, preferably for 2 to about 20 minutes in order to displace all of the air in the support particles. A soaking period of from about 10 to about 15 minutes with intermittent or continuous agitation of the solution and support particles is usually adequate.

Additional precaution should be taken when a support material containing aluminum ions is exposed to excess solution at relatively low pH. It is believed that certain constituents of the impregnating solution, particularly the acid of phosphorus, react with aluminum and degrade the support, foul the impregnating solution and result in the formation of undesirable chemical forms on the finished catalyst. As a result, the extent of such emersion, particularly in the presence of alumina containing supports should not be excessive.

Another impregnating method which has found wide application due to the previous necessity for maintaining relatively low active component concentrations is the cyclic or multi-dip procedure wherein the active support is repeatedly contacted with impregnating solution with or without intermittent drying. As previously mentioned, this procedure is less desirable in that it necessitates the use of procedures far more complicated than the single-dip or spray technique. Yet another procedure employed by the prior art, which is not necessary with these impregnating solutions involves a prolonged contacting step at slightly elevated temperatures, e.g., 100° to 150°F., to promote the incorporation of active components onto the support. As previously mentioned, it is an object of the procedure herein described to avoid the formation of active component precipitates on the support as such. Precipitates deposit as crystallites or crystalline aggregates and result in non-uniform heterogeneous dispersion of the active component and lower activity in the resultant catalyst.

In the circulation dip impregnation procedure the impregnating solution may be circulated through a bed or catalyst support particles until the required amount of the active constituents are deposited. A more dilute solution having a higher equivalent $P/MoO_3$ ratio and somewhat higher pH may be employed when using this technique and the active component concentration in the circulating solution can be replenished as necessary during the impregnation cycle in order to build up the desired concentration of active components on the support. Equivalent $P/MoO_3$ ratios as low as .05 and pH as high as 2.5 may be employed in this process, provided the total concentration of active constituents is reduced by a factor of at least 40 percent so that the equivalent Group VI and Group VIII oxide concentrations do not exceed 14 and 4 weight-percent, respectively. These reduced concentrations are necessitated by the greatly reduced stability of the impregnating solution due to the higher pH and lower $P/MoO_3$ ratios.

In accordance with the presently preferred single step pore saturation or spray techniques the molybdenum compound is dissolved, or partially dissolved and partially suspended in water. The acid of phorphorus is usally present in an amount corresponding to a $P/MoO_3$ ratio of about 0.10 to about 0.25, preferably 0.12 to about 0.10 to about 0.25, preferably 0.12 to about 0.23. The molybdenum and phosphorus compounds are added in such amounts that the resultant absolute concentrations of each fall within the ranges previously described. The initial pH of the resultant solution is preferably within the range of about 1.0 to about 2.0. Under these conditions all of the molybdenum compound is dissolved. As previously mentioned, the pH can be increased slightly if desired by the addition of one or more of the basic materials described. If pH reduction within this range is desired, additional acid of phosphorus should be added. The Group VIII metal compound is then added to the solution of the phosphorus acid and Group VI metal compound to produce a final solution having an equivalent Group VIII metal oxide concentration of about 1 to about 8, preferably about 2 to about 5 weight-percent.

The exact concentration of the various constituents in the solution must be determined with regard to the final catalyst composition desired, the pore volume of the support particles and the time of contact of the support particles and the stability of the impregnating solution. A wide range of active component concentrations can be employed although some limitations are imposed by the selected impregnation procedure. Representative concentrations are 15 to 30 weight-percent $MoO_3$ and 1 to 10 weight-percent of the Group VIII oxides. The solutions employed in the pore saturation technique are not necessarily relatively concentrated. Active component concentrations in those systems should be somewhat higher, corresponding to 17 to about 30 weight-percent $MoO_3$ and 2 to about 8 weight-percent of the Group VIII metal oxide, and must be determined in relation to the desired composition of the final product. Nevertheless, the relative ratio of the Group VIII component to the Group VI component will generally be higher in these dilute systems when an excess of impregnating medium is employed. This is particularly true in the case of molybdenum, tungsten, nickel and cobalt. It has been observed that the Group VI component combines with the substrate more rapidly than does the Group VIII component. Consequently when deposition of the active components onto the substrate is effected at least in part by adsorption — as in the single dip and circulation dip techniques — the Group VIII to Group VI component ratio required to obtain a given final composition is higher than that required in the absence of selective adsorption effects. In contrast, the final Group VIII to Group VI component ratio is determined directly be solution composition when the pore saturation or spray techniques are employed. Selective adsorption effects are not determinative in these systems.

The pH of the solution will generally vary somewhat upon the addition of the Group VIII metal salt. The degree of such variation depends primarily upon the strength of the salt anion. For example, the addition of nickelous nitrate reduces the pH of the solution somewhat. The degree of this pH reduction is greater than that experienced when sulfate salts are employed due to the fact that the nitrate is the anion of a stronger acid than sulfuric acid. As a consequence of this effect, it is generally desirable to further adjust the final pH of the solution after addition of the Group VIII metal salt to the preferred value of from 1 to about 2, preferably from about 1.3 to about 1.7. If the pH of the final solution is lower than about 1 and higher than about 2, the stability of the final solution is reduced with the consequent appearance of precipitates or crystallites in the more concentrated solutions.

The desired stability of the impregnating solution is easily demonstrated by spreading a thin layer of the solution on a glass slide and allowing it to dry gradually under ambient conditions. The stable solutions prepared by the procedure herein described will dry to a completely amorphous transparent film as demonstrated by X-ray diffraction examination of the resultant film. Solutions not meeting these criteria do not form transparent thin films under conditions of this test but become opaque or translucent on drying due to precipitation and/or crystallization.

As illustrated by the examples hereinafter discussed, the catalysts prepared from the less stable impregnating solutions are far less active than those prepared from the solutions herein described. It appears that these differences in activity are attributable, at least in part, to the formation of crystallites and precipitates during impregnation. It is believed that this precipitation and crystallite formation results in the segregation of the several constituents into different crystalline species and the consequent formation of heterogeneous active component deposits. This type of segregation is prevented by the use of the impregnation solutions of this invention.

The wet impregnated catalyst particles are gradually dried as previously described so as to prevent the crystallization or precipitation of active constituents from the thin amorphous film deposited on the substrate. The dried pellets are then calcined to a temperature of about 800° to about 1300°F., preferably 800° to about 950°F. The rate of heating is preferably gradual, i.e., less than about 30°/min., preferably 10 to about 15°F per minute.

The methods of this invention involve the catalytic reaction of hydrogen with hydrocarbons having at least one point of carbon-to-carbon unsaturation. These methods include primarily aromatic and olefin hydrogenation. Consequently, it is essential in the conduct of these methods that the hydrocarbon feed to the reaction zone contain substantial amounts of one or more unsaturated hydrocarbon constituents. Illustrative of materials which can be hydrogenated by these methods are olefinically unsaturated materials such as ethylene, butenes, cyclohexenes, dodecenes, alkalene substituted aromatics, and aromatic containing compounds including benzenes, naphthalenes and, in general, aralkyl and alkaryl hydrocarbons having from six to about 20 carbon atoms per molecule.

The concentration of aromatic constituents in the feed can vary considerably from only nominal amounts to 100 percent. However, as a general rule, the materials having carbon-to-carbon unsaturation will constitute at least about 5 volume percent and usually an excess of about 10 volume percent of the hydrocarbon feed. Materials having the most common application in these methods boil primarily above about 100°F. However, in most applications, the principal part of the feedstock will boil in excess of about 400°F., usually in the range of about 200° to about 1100°F.

I have also discovered that the effectiveness of these methods in the presence of organonitrogen compounds is far superior to that observed with processes previously available. Organonitrogen compounds are known to effect hydrocarbon conversions. Nevertheless, if desired, the methods of this invention can be conducted with feedsticks containing substantial amounts of organonitrogen compounds without the necessity of first removing those materials or converting them to innocuous forms. When the organonitrogen compounds are not converted or removed prior to contacting in the described hydrogenation systems, feed nitrogen levels will exceed about 2 parts per million. Nitrogen levels in excess of about 10 parts per million or even 50 ppm or more are more commonly the case.

During the conduct of these methods the relevant variables including catalysts composition, total pressure, temperature, hydrogen partial pressure and contact time are controlled so as to promote a substantial increase in hydrogen-to-carbon ratio of the hydrocarbon feed. As a general rule it will be desirable to increase the hydrogen-to-carbon ratio of the unsaturated materials in the hydrocarbon feed by a factor of at least about 5 relative percent on a molar basis. In otherwords, the ratio of moles of hydrogen to atoms of carbon contained in the unsaturated feed constituents will be desirably increased by at least about 5 percent of these methods. This increase in hydrogen-to-carbon ratio usually corresponds to a reduction in the concentration of unsaturated components of at least about 5 percent, preferably at least about 10 percent on a relative basis. For example, a reduction in unsaturates level of 10 relative percent for a feed originally containing about 50 volume percent unsaturated components would correspond to the production of a product fraction containing about 45 volume percent unsaturates. Much higher conversion levels will often be desirable. However, the advantages of this invention are apparent at lower conversions as well. In any event, it is generally desirable to assume that the organonitrogen content of the product fraction is less than 20 ppm, preferably less than about 5 ppm.

It is also sometimes desirable to conduct the hydrogenation methods of this invention in the absence of substantial reduction in molecular weight of the feed material commonly characterized as hydrocracking. In the art of hydrocarbon processing, hydrocracking reactions are generally considered to involve conversions of at least about 20 percent of the feed to hydrocarbons boiling below the initial boiling point of the feed. Another indicia of hydrocracking involves comparison of the number of moles of product recovered to the number of moles of feed. As a general rule, hydrocracking processes are considered to involve the production of at least about 110 moles of product for each 100 moles of hydrocarbon feed. Consequently, when it is desirable to conduct the methods of this invention in the absence of substantial hydrocracking, the reaction should be controlled so as to convert less than 20 percent of the feed to products boiling below the initial boiling point of the feed, or conversely, to produce less than 110 moles of product for each 100 moles of hydrocarbon feed to the conversion system.

The procedures involved in ascertaining the conditions most desirable to achieve a specified conversion or recover a product of certain characteristics from a known feedstock are readily ascertainable by the artisans skilled in hydrocarbon processing. The selected feedstock can be contacted at various conditions of temperature, pressure, contact time, hydrogen partial pressure and catalyst composition to ascertain the effect of each of these variables on the selected feedstock. These effects will generally vary with the characteristics of the feed making it advisable to conduct such investigations in an effort to define the most efficient combination of system parameters. As a general rule, reaction temperatures are usually in excess of about 400°F., commonly within the range of 400° to about 950°F. Reaction pressures are usually at least about 500 psig, commonly about 500 to about 5,000 psig. Sufficient hydrogen should be added to the reaction zone to provide a superatmospheric hydrogen partial pressure. These concentrations are usually sufficient to provide hydrogen partial pressures of at least about 50 psi, generally about 100 to about 300 psi depending on the feedstock and the nature of a conversion desired. For example, suitable conditions may include temperatures of 700° to about 800°F. and hydrogen partial pressures of about 750 to about 2,000 psi. The corresponding hydrogen feed rates are usually in excess of about 50, commonly more than 100 and generally within the range of 400 to about 20,000 standard cubic feet of hydrogen per barrel of hydrocarbon feed. Substantial conversions can be obtained at conditions within these ranges at very nominal contact times. However, as a general rule, the hydrocarbon feed will be contacted with the described catalyst under reaction conditions for at least about 1 minute and usually in excess of about 5 minutes. It is often most convenient to effect these conversions in a fixed bed catalyst system wherein the hydrocarbon feed is passed over a fixed catalyst bed in which case contact times are commonly designated as liquid hourly space velocity. In these systems the liquid hourly space velocities (LHSV) are in excess of about 0.1, usually at least about 0.4 and commonly within the range of about 0.4 to about 15.

The following examples serve to more particularly illustrate the invention and the advantages thereof.

EXAMPLES 1–7

The catalysts of these examples were all prepared by identical procedures, with the only variables being the proportions of the ingredients, the corresponding impregnation medium, pH and the carrier. Silica-stabilized alumina containing 4.95 percent silica was employed in Examples 1–3. Alumina stabilized with 6.63 percent silica was used in Examples 4–7. The catalysts were prepared by a single-dip procedure in which the carrier, in the form of 1/16 inch pellets, was immersed in an aqueous impregnation solution containing ammonium heptamolybdate, nickelous nitrate hexahydrate and orthophosphoric acid, and having the equivalent oxide concentration reported in Table 1. The particles were contacted for the designated period under house vacuum (22–25 mm. Hg) and then decanted on a number 5 buchner funnel. The catalysts were then dried and activated by heating at a rate of 50°F/hr up to 900°F at which they were maintained for 2 hours. Each of the catalysts was activated by the preferred calcination procedure with provision for intimately contacting the impregnated pellets with 6 to 8 SCF of ambient air at about 70°F inlet temperature per pound of catalyst per minute throughout the period of drying and calcination.

The calcination was carried out in a muffle furnace fitted with a fine screen rack on which the specimen was spread in a thin layer, no deeper than about one-half inch, through which air was passed during drying and calcining. About 500 to 1000 grams of wet impregnated catalyst particles were placed on a stainless steel screen 15 × 15 inch square having less than 10 mesh per inch. This screen is supported on a perforated stainless steel tray positioned on a furnace rack in an electrically heated vertical draft oven having an air inlet at the base. Air was blown into the bottom of the furnace at a rate of 4 to 12 standard cubic feet per minute and passed up through the furnace and through the bed of catalyst supported on the porous screen.

The hydrofining activity of each catalyst was determined by passing a mixed gas oil over a fixed bed of catalyst at a temperature of 725°F, a pressure of 1,400 psig, space velocity of 2.0 LHSV and a hydrogen rate of 6,000 SCF/barrel of feed. The mixed gas oil feed had a boiling point range of 400° to 900°F, an API gravity of 23.2 and contained 1.19 weight percent sulfur and 0.195 weight percent nitrogen. The residual basic nitrogen in the liquid product, after scrubbing with 5 percent sodium hydroxide, was monitored and used to calculate percent activity with reference to a standard catalyst by the following equation:

$$\mathrm{Log}\left(\frac{B_N \text{ Feed}}{B_N \text{ Product(from ``X'' Cat.)}}\right)$$
$$\div \mathrm{Log}\left(\frac{B_N \text{ Feed}}{B_N \text{ Product(from Ref. Cat.)}}\right)$$
$$\times 100 = \% \text{ Activity}$$

Percent denitrogenation was also calculated from the total nitrogen in the product averaged over the last 12 hours on the feed. Results are given in Table I in which the denitrogenation (DeN) activities are expressed as volume percent and weight percent relative to the activity of the reference catalyst. The latter is a commercial hydrotreating catalyst consisting of 16.4 percent $MoO_3$, 2.9 percent NiO, 1.3 percent P on gamma alumina stabilized with 4.5 weight percent silica. This catalyst was prepared by impregnation of the support with an aqueous system containing 17.4 wt. percent $MoO_3$ as ammonium heptamolybdate and 3.5 wt. percent NiO as nickel nitrate with a $P/MoO_3$ weight ratio of 0.085 at a pH greater than 2.6.

The volume percent activity of the catalyst of Example 1, in which the $P/MoO_3$ ratio was 0.185 and the initial pH of the impregnation solution was 1.9, was 140 percent of the reference catalyst. The catalyst of Example 2, in which the $P/MoO_3$ weight ratio in the product was only 0.11 and the initial pH of the impregnation medium was 2.0, had an activity of only 123 volume percent of the reference catalyst. This difference was even more pronounced on a weight basis of conversion, i.e., 123 versus 103. The catalyst of Example 1 was the most active even though it contained less active metal. The catalyst of Example 3 prepared at an initial solution pH of 1.3 and a $P/MoO_3$ solution ratio of 0.136 exhibited even higher activity. Example 4, similar to Example 1 in $MoO_3$ content, $P/MoO_3$ ratio and solution pH but employing a different carrier, had an activity similar to Example 1. Example 5, in which the equivalent NiO content was somewhat lower and the initial solution pH was 1.3 had lower activity than Example 4, but was still considerably more active than the low $P/MoO_3$ ratio catalyst of Example 2. Examples 6 and 7 impregnated at pH of 1.9 and 1.3 respectively, show that a further increase in the $P/MoO_3$ ratios to 0.175 and 0.21, respectively, does not result in any further increase in activity. In fact, the activities of these examples was less than that of Examples 3 and 4. The markedly higher activity of the catalysts prepared from impregnating solutions having pH values, $P/MoO_3$ ratios and active component concentrations within the prescribed limits is readily apparent by comparison with the reference catalyst produced under conditions preferred by the prior art.

EXAMPLES 8–21

These investigations were conducted to evaluate the effect of impregnating solution composition on the stability of the amorphous deposits formed in accordance with the method of this invention. Each of these solutions was prepared by dissolving ammonium heptamolybdate and phosphoric acid (85 percent) in water in the proportions reported in Table 2. The indicated amount of nickelous nitrate hexahydrate was then added to the solution. In several instances the pH of the final solution was adjusted upwardly by the addition of ammonium hydroxide in amounts sufficient to produce

TABLE I.—COMPOSITIONS AND DENITROGENATION ACTIVITIES OF CATALYSTS OF EXAMPLES

| | Example | | | | | | | Reference catalyst |
|---|---|---|---|---|---|---|---|---|
| | 1 | 2 | 3 | 4 | 5 | 6 | 7 | |
| Solution composition, wt. percent: | | | | | | | | |
| $MoO_3$ | 17.8 | 25.4 | 20.4 | 20.4 | 20.4 | 17.8 | 19.8 | 17.4 |
| NiO | 3.9 | 4.0 | 3.7 | 3.7 | 3.7 | 3.9 | 4.1 | 3.5 |
| P | 2.5 | 2.3 | 2.8 | 2.8 | 2.8 | 2.50 | 3.5 | 1.5 |
| $P/MoO_3$ | 0.140 | 0.091 | 0.136 | 0.136 | 0.136 | 0.140 | 0.176 | 0.085 |
| pH | 1.9 | 2.0 | 1.3 | 1.3 | 1.3 | 1.9 | 1.3 | 2.6 |
| Contact time, min | 15 | 15 | 15 | 15 | 15 | 120 | 15 | |
| Catalyst composition, wt. percent: | | | | | | | | |
| $MoO_3$ | 15.2 | 21.7 | 18.4 | 18.2 | 19.5 | 18.4 | 16.9 | 16.3 |
| NiO | 2.95 | 3.07 | 2.97 | 2.96 | 2.88 | 2.93 | 2.82 | 2.8 |
| P | 2.81 | 2.40 | 2.96 | 3.04 | 3.41 | 3.26 | 3.58 | 1.30 |
| $P/MoO_3$ | 0.185 | 0.110 | 0.162 | 0.166 | 0.175 | 0.175 | 0.210 | 0.080 |
| Activity, weight of catalyst, g | 164 | 175 | 171 | 171 | 175 | 151 | 167 | 146 |
| Vol. percent of DeN activity | 140 | 123 | 150 | 154 | 137 | 140 | 143 | 100 |
| Wt. percent of DeN activity | 125 | 103 | 128 | 132 | 116 | 127 | 125 | 100 |
| Percent DeN | 95.41 | 94.00 | 96.87 | | 96.21 | 96.56 | 96.67 | 91.8 | the indicated pH change. Each solution was aged overnight (12 hours) at 75°F in glass bottles. Equal portions of each fresh solution were also deposited on glass slides and dried gradually at 75°F. Visual observations for both of these tests are reported in Table 2.

TABLE 2

| Example No. | 8 | 9 | 10 | 11 | 12 | 13 | 14 | 15 | 16 | 17 | 18 | 19 | 20 | 21 |
|---|---|---|---|---|---|---|---|---|---|---|---|---|---|---|
| Ammonium heptamolybdate, g | 41.0 | 41.0 | 41.0 | 41.0 | 41.0 | 41.0 | 41.0 | 41.0 | 41.0 | 41.0 | 41.0 | 41.0 | 25.5 | 41.0 |
| $MoO_3$, g | 33.6 | 33.6 | 33.6 | 33.6 | 33.6 | 33.6 | 33.6 | 33.6 | 33.6 | 33.6 | 33.6 | 33.6 | 20.91 | 33.6 |
| Phosphoric acid (85%), g | 7.0 | 10.4 | 12.0 | 17.0 | 17.5 | 22.0 | 22.0 | 27.0 | 27.0 | 17.0 | 22.0 | 27.0 | 6.6 | None |
| P, g | 1.88 | 2.80 | 3.23 | 4.57 | 4.70 | 5.91 | 5.91 | 7.26 | 7.26 | 4.57 | 5.91 | 7.26 | 1.77 | |
| Water approx., ml | 75 | 75 | 75 | 75 | 75 | 75 | 75 | 75 | 75 | 75 | 75 | 75 | 75 | 75 |
| pH | 4.5 | 3.5 | 2.9 | 1.7 | 1.75 | 1.6 | 1.5 | 1.4 | 1.45 | 1.75 | 1.45 | 1.20 | 3.7 | 5-6.0 |
| Nickelous nitrate hexahydrate, g | 24.0 | 24.0 | 24.0 | 24.0 | 24.0 | 24.0 | 24.0 | 24.0 | 24.0 | 24.0 | 24.0 | 24.0 | 16.5 | 24.0 |
| NiO, g | 6.16 | 6.16 | 6.16 | 6.16 | 6.16 | 6.16 | 16.6 | 6.16 | 6.16 | 6.16 | 6.16 | 6.16 | 4.24 | 6.16 |
| Total volume of solution, ml | 120 | 120 | 120 | 120 | 120 | 120 | 120 | 120 | 120 | 110 | 110 | 100 | 120 | 120 |
| pH | 3.5 | 2.3 | 1.9 | 1.3 | 1.25 | 1.15 | 1.1 | 1.05 | 1.3 | 1.0 | 1.0 | 0.9 | 2.6 | ~4 |
| Adjust pH with $NH_4OH$ | None | None | None | None | 1.60 | None | 1.60 | None | 1.70 | 2.3 | 2.3 | 2.3 | None | None |
| Final volume, ml | 120 | 120 | 120 | 120 | 123.5 | 120 | 125 | 120 | 132 | 120 | 121 | 118 | 120 | 120 |
| $MoO_3$, g./cc | 0.2825 | 0.2825 | 0.2825 | 0.2825 | 0.280 | 0.2825 | 0.268 | 0.2825 | 0.255 | 0.2825 | 0.2825 | 0.2825 | 0.1742 | 0.2825 |
| NiO, g./cc | 0.0517 | 0.0517 | 0.0517 | 0.0517 | 0.0515 | 0.0517 | 0.0512 | 0.0517 | 0.047 | 0.0517 | 0.0517 | 0.0517 | 0.0353 | 0.0517 |
| P, g./cc | 0.0157 | 0.0233 | 0.0269 | 0.0384 | 0.0380 | 0.0493 | 0.0472 | 0.0605 | 0.055 | 0.0380 | 0.0472 | 0.0605 | 0.0148 | |
| P/$MoO_3$, wt. ratio | 0.056 | 0.083 | 0.095 | 0.136 | 0.136 | 0.176 | 0.176 | 0.216 | 0.216 | 0.136 | 0.176 | 0.216 | 0.085 | 000 |
| Dried film on glass slide | Yellowish opaque | | | | Transparent | | | (1) | (2) | Film cracking | | | (3) | |
| Solution characteristics after 12 hours | (4) | (4) | (4) | (5) | (6) | (5) | Clear | (6) | Clear | (7) | (7) | (7) | (8) | (9) |

1 Slightly opaque.
2 Transparent.
3 Opaque yellow.
4 Crystalline deposit. Yellow fine crystalline precipitate.
5 Clear.
6 Trace sediment.
7 Glass bottles containing the 3 solutions were lined with crystalline material. pH is too high for stable solution.
8 Ppt. with yellow fines formed slowly.
9 White precipitate begins to form in 5-10 min. Voluminous after 1 hr.

EXAMPLES 22 AND 23

These two examples illustrate the influence of aging the substrate in contact with impregnating medium on the activity of the resultant catalyst.

A solution containing 410 grams of ammonium heptamolybdate, 210 grams of 85 percent orthophosphoric acid and 220 grams of nickelous nitrate hexahydrate made up to a total volume of 950 ml, and pH adjusted to 1.3 by the addition of several ml of concentrated ammonium hydroxide was dripped from a separatory funnel onto 1,300 grams of silica-stabilized alumina extrudates in an evacuated 4-liter flask. The flask was vigorously shaken by hand during and after the addition of the solution to aid in its distribution. This volume of solution was enough to fill the pore volume of the extrudates and wet them enough so that they adherred to each other and the flask. There was no free liquid in the flask. The agitation under vacuum was continued for 20 minutes. The temperature of the wet extrudates increased from about 77°F to about 122°F during this period of time. The wetted and impregnated extrudates were divided into two parts.

A 1,000 gram portion of the wetted impregnated extrudates which had been aged for 20 minutes was spread on a stainless steel screen tray in the Kress box muffle furnace and dried at 200°F for 16 hours. The dried pellets were then distributed on a stainless steel screen suspended within a top-opening Kress muffle furnace and heated at a controlled rate of 50°F per hour to 900°F, at which temperature they were maintained for 2 additional hours. Through-out the entire drying and calcination period ambient air, having an inlet temperature of 75°F was passed into the bottom of the furnace and over the pellets at a rate of about 7 standard cubic feet per minute per pound of catalyst.

The remaining material in the 4-liter impregnating flask was aged under ambient conditions with occasional shaking by hand for an additional 100 minutes. The impregnated and aged extrudates were then distributed on a 15 inches square stainless steel tray and placed in an oven at ambient conditions. The oven was turned on and heated to 200°F and the catalyst was held in the oven overnight (16 hours). House vacuum was applied to draw air through the oven during this period. The dried extrudates were then calcined in the Kress box-type muffle as described above. The compositions and activity of these two catalysts were determined as in Example 3 and are compared in Table 3.

TABLE 3

| Example No. | Aging time, minutes | Composition, Wt.% | | | Hours | Activity Test % activity |
|---|---|---|---|---|---|---|
| | | MoO | NiO | P | | |
| 22 | 20 | 18.4 | 3.09 | 2.97 | 60 | 132 |
| 23 | 120 | 17.7 | 3.13 | 2.94 | 60 | 150 |

These results demonstrate that considerable advantage can be achieved by aging catalysts impregnated by single step pore saturation.

The following four examples further demonstrate the superiority of these methods with regard to hydrogenation conversions. All of these examples were conducted employing a feedstock having the properties illustrated in Table 4.

TABLE 4
FEED PROPERTIES

| Gravity, °API | 17.9 | |
|---|---|---|
| ASTM Distillation, D-1160, °F | | |
| IBP | 512/567 | |
| 10/20 | 589/610 | |
| 30/40 | 638/645 | |
| 50/60 | 683/704 | |
| 70/80 | 731/757 | |
| 90/95 | 806/839 | |
| Max./Rec, Vol % | 857/98 | |
| Sulfur, X-ray, Wt % | 3.54 | |
| Nitrogen, Total, Wt % | 0.183 | |
| Basic, Wt % | 0.0681 | |
| Acid Solubility, Vol % | 68.5 | |
| Universal High Mass, Wt % | 29.1 | |
| Total Aromatics | 31.6 | |
| Monoaromatics | | 14.4 |
| Diaromatics | | 10.7 |
| Triaromatics | | 9.6 |
| Tetraaromatics | | 5.2 |
| Pentaaromatics | | 2.3 |
| Total Sulfur Compounds | 18.2 | |
| Monobenzothiophenes | | 5.3 |
| Dibenzothiophenes | | 2.7 |
| Tribenzothiophenes | | 1.4 |

| | |
|---|---|
| Aromatic Sulfides | 0.5 |
| Alkyl Sulfides | 4.3 |
| Thiophenes | 4.0 |

(1) Excludes 9.9% of total aromatics present as sulfur compounds and reported as such.

EXAMPLE 24

The catalyst of this example was similar to the reference catalyst discussed in Table 1 and was prepared by impregnating by pore saturation a silica-stabilized alumina support containing about 5 weight-percent silica with an aqueous solution containing ammonium heptamolybdate, nickelous nitrate hexahydrate, cobalt nitrate and orthophosphoric acid in amounts corresponding to 17.4 weight percent $MoO_3$, about 3.5 weight-percent NiO, and about 1.5 weight-percent P. The impregnated composition containing 15.6 weight-percent $MoO_3$, 3.2 weight-percent NiO, and about 1.3 weight-percent P on an equivalent total weight basis was then thermally activated in a commercial indirect fired rotary calciner to a maximum temperature of 950°F without excessive draft of air. This catalyst was then used to convert the feed identified in Table 4 in a fixed bed catalyst system operating once through with a single stage at 740°F., 1275 psig, a liquid hourly space velocity (LHSV) of 0.59 and a hydrogen injection rate of 600 standard cubic feet per barrel of hydrocarbon feed. The results of this operation are summarized in Table 5.

EXAMPLE 25

The hydrogenative conversion of Example 24 was repeated using the catalyst described in Example 24 and the feedstock identified in Table 4 at a reduced temperature of 715°F. to provide a comparison between these methods at somewhat less severe conditions. The results of this operation are also summarized in Table 5.

EXAMPLE 26

The method demonstrated in this example employed a catalyst prepared by the circulation dip method using a solution containing 13.4 wt. percent $MoO_3$, about 3.6 wt. percent NiO, about 1.2–1.3 wt. percent P and having an initial pH of about 2.5 and a $P/MoO_3$ ratio of about 0.11. The finished catalyst had an equivalent composition of 16.6 weight-percent $MoO_3$, 3.27 weight-percent NiO, and 3.09 weight-percent P on gamma alumina stabilized with 4.5 weight-percent silica. This catalyst was used to convert the feed identified in Table 4 in a single-stage once through system using hydrogen at conditions otherwise identical to those described in Example 24. The results of this operation are summarized in Table 5.

EXAMPLE 27

The hydrogenative conversion described in Example 26 was repeated at conditions of less severity at a temperature of 715°F. to provide a comparison to the method demonstrated in Example 25. The results of this operation are summarized in Table 5 along with the results of Examples 24 through 26.

TABLE 5

| Example No. | 24 | 25 | 26 | 27 |
|---|---|---|---|---|
| Conditions reactor | | | | |
| reactor temperature, °F. | 740 | 715 | 740 | 715 |
| reactor pressure, psig | 1275 | 1275 | 1275 | 1275 |
| LHSV, v/v/hr. | 0.59 | 0.59 | 0.59 | 0.59 |
| hydrogen, SCF/bbl | 6000 | 6000 | 6000 | 6000 |
| Product properties full range product acid solubility, vol % | 33.2 | 33.9 | 26.4 | 27.0 |
| total nitrogen, ppm | 19 | 35 | 0.9 | 1.2 |
| total aromatics, wt.% | (40.5) | (41.1) | (34.9) | (38.3) |
| X–375°F. fraction weight % of Product | 6.4 | 3.9 | 11.9 | 6.5 |
| aromatics Wt.% of Fraction | (20) | (22) | (15) | (21) |
| Wt.% of Total | (1.3) | (0.9) | (1.8) | (1.3) |
| 375°–575°F. fraction Weight % of Product | 31.3 | 29.0 | 41.0 | 38.8 |
| Aromatics Wt.% of Fraction | (50) | (50) | (45) | (50) |
| Wt.% of Total | (15.7) | (14.5) | (18.4) | (19.4) |
| 575°F.-plus fraction Weight % of Product | 62.2 | 67.2 | 46.0 | 54.6 |
| Aromatics, Wt.% of fraction | | | | |
| Monoaromatics | | 26.9 | | 22.9 |
| Diaromatics | | 6.5 | | 5.5 |
| Triaromatics | | 3.4 | | 2.5 |
| Tetraaromatics | | 0.1 | | 0.1 |
| Total, % of Fraction | 37.8 | 38.3 | 31.9 | 32.3 |
| Total, % of Total | 23.5 | 25.7 | 14.7 | 17.6 |
| Sulfur, ppm | 28 | 113 | 14 | 39 |

A further demonstration of the superior hydrogenative conversion activity of the methods of this invention is provided by comparison of the aromatics conversion obtained in Examples 26 and 27 as opposed to that observed in Examples 24 and 25. In making this comparison, reference must be made to the characteristics of the original feedstock. The total aromatics concentration of the feed was about 41.5 weight-percent including the sulfur containing aromatic precursors, i.e., monobenzothiophenes, dibenzothiophenes, tribenzothiophenes and aromatic sulfides. Comparison of the total aromatics concentration in the products of Examples 24 and 25 to the aromatics concentration of the feed illustrates that the comparison method was at best able to convert only a nominal amount of the aromatics in the original feed at 715°F. in Example 25 corresponding to a relative conversion of less than 1 percent. A somewhat higher although still nominal conversion of about 2.4 percent was obtained in Example 24. In contrast, the relative aromatic conversions obtained by the methods of this invention in Examples 26 and 27 were 18.3 and 7.7 percent, respectively. From these comparisons it is readily apparent that the hydrogenation activity of the methods of this invention is many times greater than that exhibited by the comparison method.

This distinction is amplified even more when it is observed that the aromatics remaining in the product obtained in Examples 26 and 27 were reduced to products boiling below 575°F. to an extent greater than that observed in the comparison methods of Examples 24 and 25. For example, 20.2 and 20.7 percent of the product boiling below 575°F. in Examples 26 and 27, respectively, was aromatic as opposed to only 17.0 and 15.4 percent for Examples 24 and 25, respectively. This evidence illustrates that the aromatics remaining in the products of Examples 26 and 27 were at least partially converted — presumably by hydrogenation of one or more aromatic nuclei — to a greater extent than that observed in Examples 24 and 25. This conclusion is also supported by the lower relative total aromatics concentration in the 575°F.plus fraction and the lower relative concentrations of diaromatics and triaromatics in that product.

Numerous variations and modifications of the concept of this invention will be apparent to one skilled in the art in view of the aforegoing disclosure and the appended claims.

I claim:

1. The method of hydrogenating a hydrocarbon feed containing at least a substantial proportion of unsaturated hydrocarbons having at least one point of carbon-to-carbon unsaturation which comprises reacting said feed with hydrogen under a superatmospheric hydrogen partial pressure and conditions of temperature, pressure and contact time sufficient to substantially reduce the concentration of said unsaturated hydrocarbons in the presence of a catalytic composition formed on impregnating a foraminous support with an aqueous impregnating medium having an initial pH below about 2.5 which forms on admixture of at least one molybdenum compound selected from ammonium heptamolybdate, ammonium phosphomolybdate, molybdic acid, molybdenum trioxide and molybdenum blue, at least one water soluble compound of nickel or cobalt and an acid of phosphorus, in proportions equivalent to about 10 to about 30 weight-percent molybdenum trioxide, about 1 to about 10 weight-percent nickel or cobalt oxide and a P/MoO$_3$ weight ratio of about 0.1 to about 0.25 and activating the resultant combination.

2. The method of claim 1 wherein said water soluble compound is selected from the nitrates, sulfates, fluorides, chlorides, hydroxides, carbonates and bromides of nickel and cobalt, said molybdenum compound is ammonium heptamolybdate, said acid of phosphorus is orthophosphoric acid, and the concentration of said molybdenum compound exceeds about 17 weight percent MoO$_3$.

3. The method of claim 1 wherein said catalytic composition contains about 5 to about 40 weight-percent MoO$_3$ and about 1 to about 10 weight-percent of the corresponding oxide of nickel or cobalt, said water soluble compound is selected from the nitrates, sulfates, hydroxides, carbonates and chlorides of nickel and cobalt and said feed comprises at least about 10 weight percent of aromatic hydrocarbons having six to about 20 carbon atoms.

4. The method of claim 1 wherein said hydrocarbon feed boils substantially above about 100°F. and comprises at least about 5 volume percent of unsaturated hydrocarbons selected from olefinic and substituted and unsubstituted aromatic hydrocarbons, said hydrocarbon is contacted at a temperature of at least about 400°F., a pressure of at least about 500 psig for at least about 1 minute under a superatmospheric hydrogen partial pressure corresponding to at least about 100 standard cubic feet of hydrogen per barrel of said hydrocarbon sufficient to increase the hydrogen-to-carbon ratio of said unsaturated hydrocarbons by at least about 5 relative percent, and said foraminous support is an alumina containing refractory oxide.

5. The method of claim 4 wherein said hydrocarbon feed contains at least about 2 parts per million nitrogen as organonitrogen compounds.

6. The method of claim 4 wherein said hydrocarbon feed contains at least about 10 parts per million nitrogen as organonitrogen compounds and at least 10 volume percent of said unsaturated compounds and said feed is contacted with said catalyst under conditions sufficient to substantially reduce the organonitrogen content of said feed.

7. The method of claim 4 wherein said hydrocarbon feed is contacted with said catalyst under said hydrogenation conditions sufficient to reduce the concentration of said unsaturated hydrocarbons by at least about 5 relative percent and increase the hydrogen-to-carbon ratio of said unsaturated hydrocarbons by at least about 5 percent in the presence of less than 20 percent conversion of said feed to hydrocarbon products boiling below the initial boiling point of said feed, and said molybdenum compound is at least one of ammonium heptamolybdate and molybdic acid.

8. The method of increasing the hydrogen-to-carbon ratio of a hydrocarbon feed boiling substantially above about 100°F. and containing at least about 10 volume percent of hydrocarbons having at least one point of carbon-to-carbon unsaturation selected from olefinic and substituted and unsubstituted aromatic hydrocarbons which comprises reacting said feed with hydrogen under hydrogenation conditions including a temperature in excess of about 400°F., a pressure in excess of about 500 psig, a contact time of at least about 1 minute and a superatmospheric hydrogen partial pressure of at least 50 psi sufficient to increase the hydrogen-to-carbon ratio of said unsaturated hydrocarbons by a factor of at least about 5 percent in the presence of a catalytic composition formed on impregnating a foraminous support with an aqueous impregnating medium which forms on admixture of at least one molybdenum compound selected from ammonium heptamolybdate and molybdic acid, at least one Group VIII compounds selected from the hydroxides, carbonates and water soluble strong mineral acid salts of at least one of nickel and cobalt, and orthophosphoric acid, in proportions equivalent to about 17 to about 30 weight-percent molybdenum trioxide, at least about 2 weight-percent of the corresponding oxide of nickel or cobalt, and a P/MoO$_3$ weight ratio of about 0.1 to about 0.25 at an initial solution pH below about 2, and activating the resultant combination.

9. The method of claim 8 wherein said hydrocarbon feed boils primarily above about 400°F. and contains at least about 10 volume percent aromatic hydrocarbons having about 6 to about 20 carbon atoms per molecule and is contacted with said catalyst under a superatmospheric hydrogen partial pressure corresponding to about 400 to about 20,000 standard cubic feet of hydrogen per barrel of said feed, and conditions of temperature and pressure sufficient to reduce the concentration of said aromatic hydrocarbons by a relative amount of at least about 5 percent and reduce the organonitrogen content of said hydrocarbon to less than 5 parts per million nitrogen.

10. The method of claim 9 wherein said hydrogenation conversion is effected in the presence of less than 20 percent conversion of said feed to hydrocarbon products boiling below the initial boiling point of said feed.

11. The method of claim 9 wherein said molybdenum compound comprises primarily ammonium heptamolybdate, said Group VIII compound comprises primarily at least one of nickel nitrate and cobalt nitrate and is present in said medium in an amount corresponding to about 1 to about 8 weight-percent of the corresponding metal oxides.

* * * * *